United States Patent [19]
Sharber

[11] Patent Number: 5,305,711
[45] Date of Patent: Apr. 26, 1994

[54] TANK FOR ELECTROANESTHETIZING FISH

[76] Inventor: Norman G. Sharber, 515 W. Havasupi Rd., Flagstaff, Ariz. 86001

[21] Appl. No.: 17,384

[22] Filed: Feb. 12, 1993

Related U.S. Application Data

[63] Continuation of Ser. No. 874,715, Apr. 27, 1992, Pat. No. 5,253,610.

[51] Int. Cl.⁵ .................................................. A01K 63/00
[52] U.S. Cl. ...................................... 119/215; 119/220
[58] Field of Search ............................................. 119/3

[56] References Cited

U.S. PATENT DOCUMENTS

| | | | |
|---|---|---|---|
| 1,292,246 | 1/1919 | Burkey | 119/3 |
| 1,838,215 | 12/1931 | De Clairmont | 119/5 |
| 1,974,444 | 9/1934 | Burkey | 119/220 |
| 2,146,105 | 2/1939 | Baker | 119/3 |
| 4,221,187 | 9/1980 | Casey | 119/3 |
| 4,750,451 | 6/1988 | Smith | 119/3 |
| 4,825,810 | 5/1989 | Sharber | 119/3 |
| 5,048,458 | 9/1991 | Ebner et al. | 119/3 |

*Primary Examiner*—Robert P. Swiatek
*Attorney, Agent, or Firm*—Cahill, Sutton & Thomas

[57] ABSTRACT

Anode and cathode electrodes are placed at the upstream downstream ends of an elongated tank containing fish to be electroanesthetized by applying an electric signal to the electrodes to create an electric field within the tank sufficient to induce petit mal in the fish. By maintaining a flow of water in the tank from the end containing the anode electrode to this end containing the cathode electrode, the fish will tend to head toward the anode electrode and be subject to the largest voltage gradient induced by the electric field. A barrier at each of the anode and cathode electrodes prevents contact by the fish to protect the fish against injurious electrical shock.

20 Claims, 3 Drawing Sheets

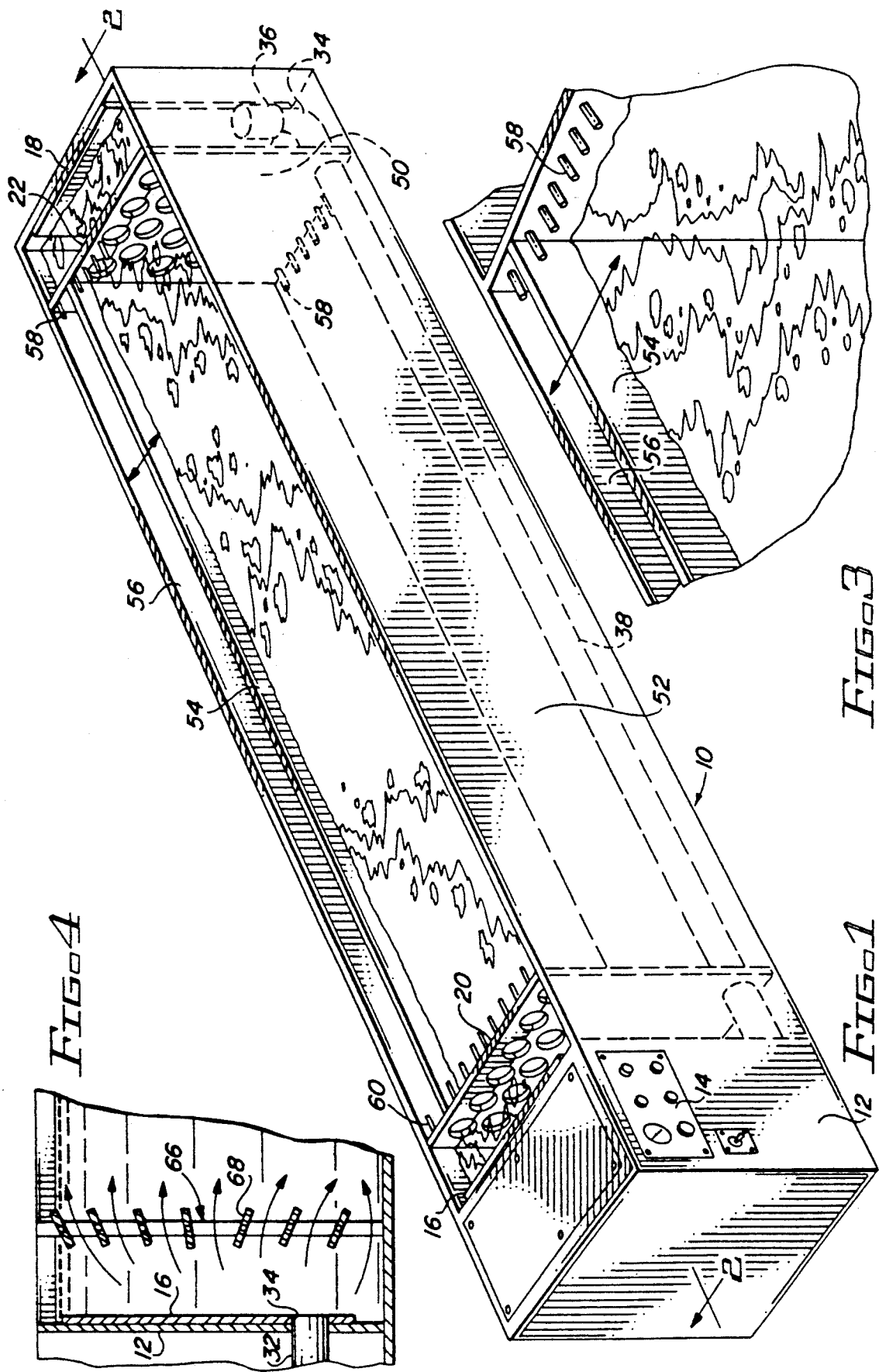

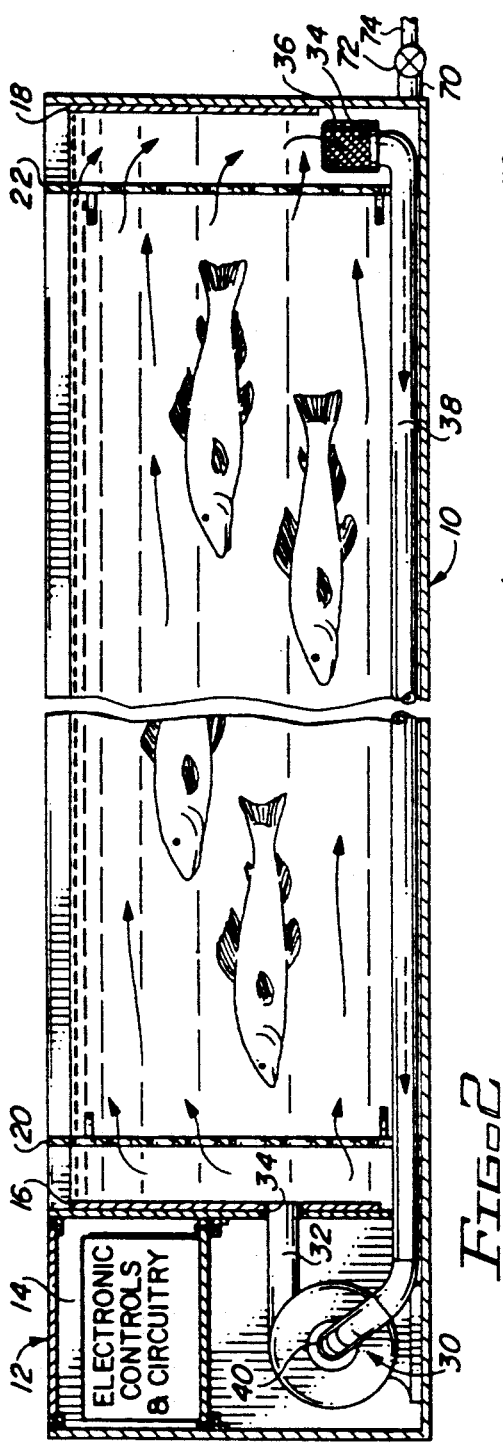
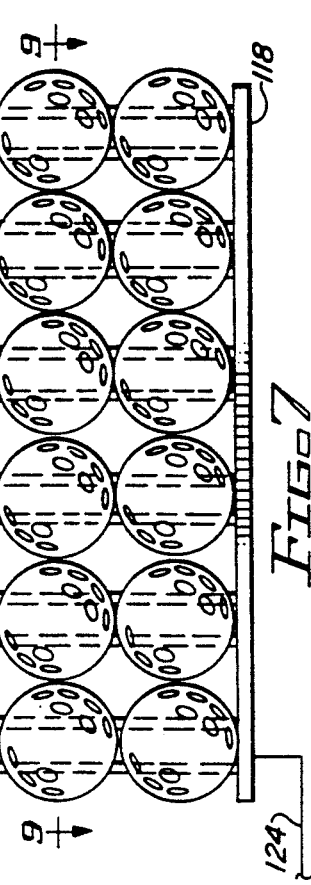
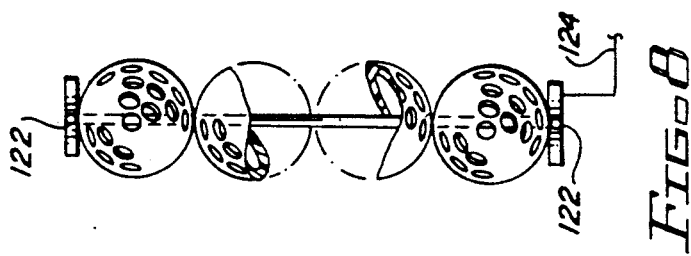
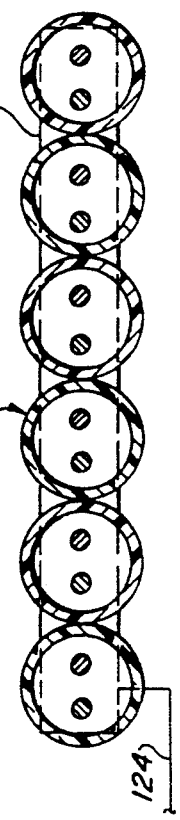

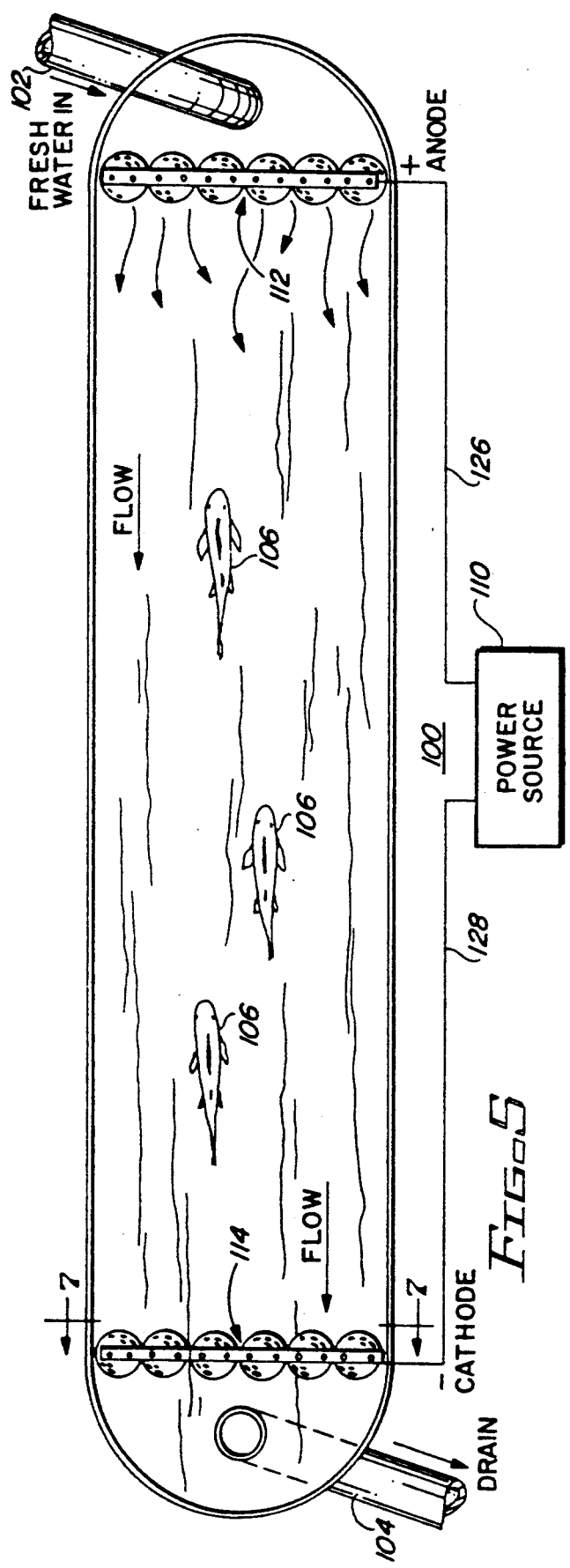
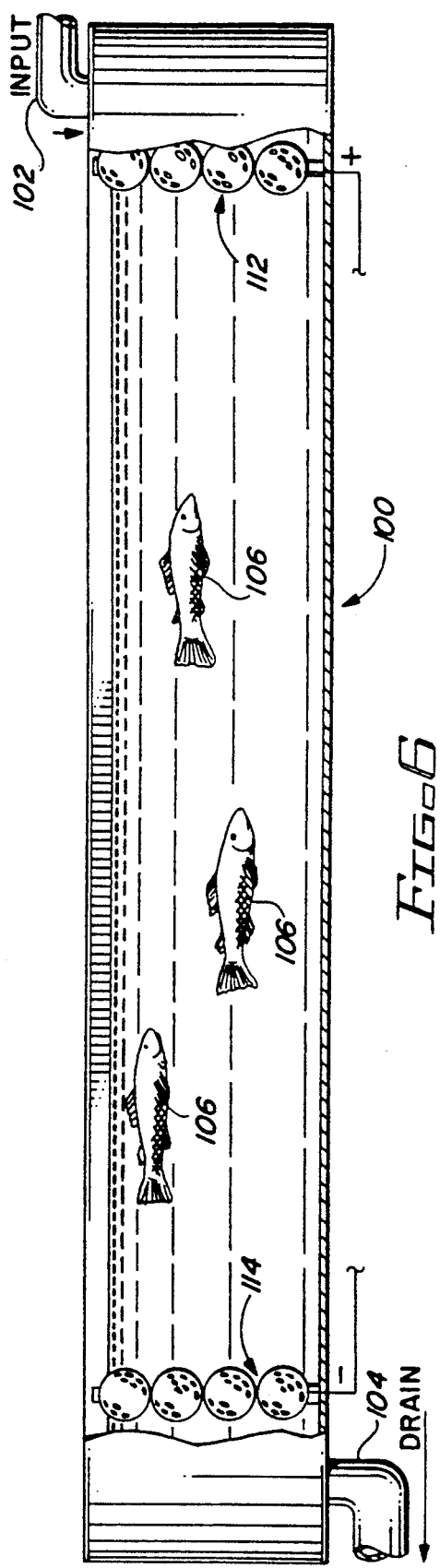

TANK FOR ELECTROANESTHETIZING FISH

This is a continuation of pending prior application Ser. No. 07/874,715 filed on Apr. 27, 1992, now U.S. Pat. No. 5,253,610.

CROSS REFERENCE TO RELATED APPLICATIONS

Circuitry useful in the practice of the present application is disclosed in my copending application entitled "ELECTROFISHING APPARATUS AND METHOD", Ser. No. 446,652, now U.S. Pat. No. 5,111,379. The circuitry described therein is incorporated herein by reference.

BACKGROUND OF THE INVENTION

Field of the Invention

The present invention relates to apparatus for electroanesthetizing aquatic animals and, more particularly, to a holding tank for electroanesthetizing fish.

Description of Related Art

Since about the turn of the century, batches of fish have been electroanesthesized for both scientific and commercial purposes. For scientific purposes, small tanks are used to contain a limited number of fish. For commercial purposes, much larger tanks are used to permit electroanesthetizing a large batch of fish commensurate with the production rate of the related commercial purposes. For each purpose, an electric charge is introduced through electrodes disposed at the opposed ends or opposed sides of the tank. A sufficient electrical charge is provided to induce epileptic seizures in the fish. Two significant levels of seizure are recognizable: petit mal and grand mal. In both types of seizures, the fish lose consciousness and lack of motor activity. In petit mal, the muscles of the fish become flaccid but in grand mal, tetany occurs. Normally, the fish recover consciousness almost immediately after the electric charge is removed if the seizure was limited to petit mal. In the event the seizure is grand mal, regaining consciousness is much more gradual.

In both types of seizures, the fish suffer apnea, whether it be a mild or severe loss of breathing. Such loss of breathing has serious consequences for the fish and it is essential that grand mal be avoided. Moreover, petit mal should not be prolonged beyond the minimum time required to maintain unconscious.

Epileptic seizures are always accompanied by severe muscle contractions that are capable of breaking bones and rupturing soft tissues attached to muscle myotomes. These contractions are most commonly of a type known as myoclonic jerks, which are a simultaneous contractions of paired myotomes on either side of the spine. This simultaneous and instantaneous seizure of parallel muscles causes compression fractures of the spine and actually crushing (longitudinally) of individual and groups of vertebrae. Myoclonic jerks have an equal probability of occurrence in both petit mal and grand mal. When electroanesthesia is used for non aquatic animals (it has also been used for humans), it is customary to inject a muscle relaxing drug, such as curare (generally presently banned) or succinyl choline chloride to prevent these damaging muscle contractions from occurring.

More specifically, commercial fish processors of domestically raised fish, such as catfish and trout, use electroanesthesia to stun the fish just prior to processing for market. Typically, this stunning process is crude. A large stainless steel basket filled with hundreds of pounds of fish is hoisted from a holding tank. A steel rod is inserted into and along the central axis of the basket and serves as a first electrode. The basket serves as a second electrode. Electric current is supplied to and flows between the two electrodes and the mass of intervening animal tissues until the fish are completely stunned. Thereafter, the fish are dumped on to moving belts and enter the processing rooms. During application of electric current, the fish suffer myoclonic jerks, have broken backs and bleed internally. This bleeding, appearing in the form of hematomas, are present in the fish fillets sold.

When electroanesthesia is used for the study of various facets of fish, the damage resulting to the tissues and bone structure due to the presently used electroanesthesia procedures prevents certain types of studies and may skew findings or analysis. For fish to be returned to the body of water from where they were taken, such as fish on the endangered list, fatal injuries are unacceptable as well as injuries affecting reproduction, survivability and significant shortening of the life span. Establishing petit mal by introduction of chemicals, including muscle relaxants, is difficult in the case of aquatic animals and is discouraged, if not forbidden, by ecological and environmental considerations.

SUMMARY OF THE INVENTION

A holding tank for electroanesthetizing fish has water flowing from one end to the other and is of elongated configuration with a width close to the length of the fish to be placed therein. An anode electrode is located at the upstream end and a cathode electrode is located at the downstream end. Upon applying an electric signal having a batch of high frequency pulses repeated at a low frequency to the anode and cathode electrodes, the fish are induced to align themselves toward and swim to the upstream end of the tank (electrotaxis). Such alignment permits determination of the appropriate power level of the signal to induce petit mal and prevent presence of grand mal. The accurate determination of electrical power in combination with a specific pulse train to prevent myoclonic jerks anesthetizes the fish for either scientific or commercial purposes without injury to the fish.

It is therefore a primary object of the present invention to electroanesthetize aquatic animals without injuring them.

Another object of the present invention is to electroanesthetize fish to a petit mal state without inducing myoclonic jerks.

Yet another object of the present invention is to provide a holding tank for electroanesthetizing fish without causing injury to the fish.

Yet another object of the present invention is to provide a holding tank for electroanesthetizing fish, which tank is adaptable to the size of the fish contained therein.

A further object of the present invention is to provide apparatus for electroanesthetizing fish which apparatus may be modified to accept any size batch of any size fish.

A yet further object of the present invention is to provide a tank for electroanesthetizing fish, which tank has fresh or recycled water flowing therethrough.

A still further object of the present invention is to provide a method for electroanesthetizing aquatic animals without causing injury to them.

These and other objects of the present invention will become apparent to those skilled in the art as the description thereof proceeds.

BRIEF DESCRIPTION OF THE DRAWINGS

The present invention will be described With greater specificity and clarity with reference to the following drawings, in which:

FIG. 1 is a perspective view of a tank for electroanesthetizing fish;

FIG. 2 is a partial cross-sectional view taken along lines 2—2, as shown in FIG. 1;

FIG. 3 illustrates a detail for modifying the width of the tank;

FIG. 4 illustrates a detail for diffusing the water flow through the tank;

FIG. 5 is a top view of a variant tank;

FIG. 6 is a side view of the variant tank;

FIG. 7 is an elevational view of one of the electrodes;

FIG. 8 is a side view of the electrode shown in FIG. 7; and

FIG. 9 is a cross-sectional view taken along lines 9—9, as shown in FIG. 7.

DESCRIPTION OF THE PREFERRED EMBODIMENT

Referring to FIG. 1, there is illustrated a tank 10 for inducing electroanesthesia in fish. As will be described below, use of tank 10 produces petit mal in fish without the muscle, bone and spinal injuries resulting from presently used apparatus for inducing electroanesthesia. Furthermore, use of tank 10 eliminates the need for chemicals to render fish unconscious and cause cessation of motor activity or muscle relaxant chemicals to reduce injuries during electroanesthesia. Both types of chemicals may soon be banned because of their harmful effects to endangered species; furthermore, poisoning or ill effects from eating fish containing such chemicals is eliminated. Ecological and environmental impacts of such chemicals have caused or may cause them to be banned.

Typically, the structure of tank 10 is of plastic, epoxy or other electrically non conductive material. The illustrated size, whether for scientific or commercial purposes, may be on the order to twelve feet long by two feet wide by thirty inches deep. This size may vary, particularly the width, as a function of the size of the fish and the number of fish per batch to be electroanesthetized. The tank may include a cabinet 12 disposed at one end, which cabinet includes a pump for drawing water from one end and injecting it at the other end to create a constant water flow through the tank. The cabinet may also include circuit unit 14 for generating and transmitting a particular electrical signal between anode plate 16 and cathode plate 18. For example, the circuitry may be of the type described in pending patent application entitled "ELECTROFISHING APPARATUS AND METHOD", Ser. No. 446,652. Such a circuit produces a signal having a packet of high frequency pulses repeated at a low frequency rate. Such pulses have several benefits. First, it is well known that fish in the presence of an electric field and under the influence of a rheobase voltage are involuntarily caused to head toward the anode electrode through an induced normal swimming muscular response (electrotaxis). This condition is augmented by the flow of water from anode plate 16 to cathode plate 18 since fish, even without the presence of an electric field, tend to orient themselves with their head into a water current. Knowing the average size of the fish within tank 10, a sufficient power level of the signal transmitted by circuit unit 14 is supplied to subject the fish to a voltage gradient from head to tail greater than the rheobase voltage, irrespective of where within the tank the fish may be. Thus, all the fish within the tank will be under the influence of the electric field generated sufficient to produce electrotaxis.

The electric field will produce petit mal in the fish, which is a condition in which the fish are unconscious and motor activity ceases. Myoclonic jerks, usually producing spinal and musculature injuries is avoided by the nature of the pulse train transmitted, which pulse train permits relaxation of the white tissue muscles between pulses and accompanying red tissue muscle stimulations.

To obtain a relatively uniform flow rate laterally across tank 10, an upstream diffuser 20 may be used; such a diffuser may be a simple apertured plate, as illustrated in FIGS. 1 and 2. A similar diffuser plate 22 may be used at the downstream end upstream of cathode plate 18 to encourage relatively uniform flow rate laterally across the tank. As particularly shown in FIG. 2, a pump 30 includes an outlet pipe 32 terminating in one or more outlets 34 in general proximity with anode plate 16. For this purpose, the anode plate may be apertured, as indicated. Downstream of diffuser plate 22, a water pick-up inlet 34, which may include a filter 36, is connected to a conduit 38 to convey the water to inlet 40 of pump 30. The operation of pump 30 is controlled by circuit unit 14.

The width and depth of tank 10 may be optimized for scientific or commercial purposes where the size and number of fish per batch to be electroanesthetized are known, as shown in FIG. 3. For more general use, side walls 50 and 56 and bottom 52 are fixed. The depth of the water in the tank is regulated by controlling the amount of water introduced to the tank. The effective width of the tank may be adjusted by positioning a moveable wall 54 closer to or further away from fixed side wall 56. Thus, the space between moveable wall 54 and side wall 50 and between which the fish are placed may be adjusted to a width approximately that of the length of the fish to be placed within the tank. Such adjustment may be readily performed by providing a plurality of pegs 58,60 defining a number of columns in each of diffuser plates 22,20 for receiving and maintaining moveable wall 54. That is, the moveable wall may be placed between adjacent pairs of pegs toward or away from fixed wall 56 to temporarily set the width of the portion of the tank between movable wall 54 and fixed wall 50 to receive the fish. Preferable, the lateral dimension of the tank should be just slightly greater than the length of the fish to encourage the fish to be aligned with the longitudinal axis of the tank. With the constant flow of water, the fish will tend to head upstream.

Diffuser plates 20 and 22 may be apertured, as illustrated in FIG. 1. Alternatively, the diffuser plates may be a diffuser means 66 supporting a plurality of fixed or positionable vanes 68 to direct the outflow from outlet(s) 34 of pump 30 generally uniformly across the width and height of tank 10, as shown in FIG. 4. To maintain such uniformity of flow, the downstream diffusion means would be similarly vaned to minimize locations of non-waterflow or whirlpooling.

Means for draining tank 10 would also be provided, whether by a suction pump or a simple outlet 70 having a valve 72 for controlling flow through exhaust conduit 74. Fill of the tank may be through a conventional pump drawing water from the body of water the fish came from. An other source of water may also be used.

For commercial purposes, the initial step in processing fish is usually that of electroanesthetizing the fish. For this reason, tank 10 may be located in proximity to the source of the fish, whether a stream, the ocean, or a feed pond. Moreover, the water flow in the tank may be water drawn from such stream, ocean or pond and returned thereto. To eliminate the cost and complexities attendant pumps for this purpose and if an adjacent stream is the source of the water, water upstream may be channeled through the tank and evacuated downstream whereby gravity provides the requisite impetus for flow and the rate of flow is controlled by gates or other valve elements.

A tank 100 suitable for this purpose is illustrated in FIGS. 5 and 6. An inflow of water is provided through conduit 102, which inflow may be the outflow from a pump or natural gravity induced flow from a source of water. Outflow is through conduit 104, which outflow may be induced by a pump or by gravity. With such inflow and outflow, fish 106 in tank 100 are continuously swimming in fresh water. The length, width and height of tank 100 is, as described above, a function of the size and number of fish per batch to be electroanesthetized. Accordingly, tank 100 may include a moveable wall, such as described with respect to tank 10 or other means may be employed to reduce the width of tank 100 commensurate with the size of the fish to obtain upstream orientation of the fish. Circuit unit 110 generates a pulse train of the type described above to transmit a stream of high frequency pulses repeated at a low frequency rate from anode electrode 112 to cathode electrode 114 to establish an electric field therebetween.

Because cost is always a consideration, the anode and cathode electrodes may be constructed in accordance with the structure illustrated in detail in FIGS. 7, 8 and 9. Each electrode (112,114) includes upper and lower bars 116,118 interconnected by a plurality of single or paired wires or rods 120. Bars 116,118 may be electrically conductive. However, if such bars are electrically conductive, there is a danger that the fish may come in direct contact with the bars and thereby be injured. To avoid such injury, the bars may be electrically nonconductive and a conductor 122 may be disposed in each bar to electrically interconnect the respective ends of conductors 120. One or both of conductors 122 is electrically connected to electrical conductor 124. Conductor 124 extending from anode electrode 112 and conductor 124 extending from cathode electrode 114 is connected to the respective one of anode and cathode leads 126,128 extending from circuit unit 110.

To prevent contact by the fish with any of conductors 120 of the anode or cathode electrodes a water permeable barrier or wall must be located about the conductors. Such a barrier may be formed by plurality of hollow apertured plastic balls of the type sold commercially as practice golf balls, baseballs or softballs threaded upon each or upon pairs of conductors (as illustrated). Balls of this type are sometimes referred to as "whiffle" balls or by the trademark "Fun Ball". These hollow apertured balls 130 prevent direct contact by the fish with the engaged conductor(s) yet the conductors remain essentially uninsulated from the surrounding water resulting in minimal, if any, degradation of electric field strength between the anode and cathode electrodes.

Water flowing through each of anode electrode 112 and cathode electrode 114, will become turbulated because of the flow through and around apertured balls 130; moreover, the flow will be generally diffused across the full height and breadth of the anode electrode and the cathode electrode. Such flow diffusion downstream of anode electrode 112 and maintained by cathode electrode 114 will tend to maintain a reasonably uniform lateral cross-sectional flow rate in tank 110. Additionally, the essentially uniform arrangement of conductors 120 across each of the upstream and downstream ends of tank 110 will provide a relatively uniform field strength across the tank. It is to be understood that the flow rate across the tank, as well as the field strength across the tank may be modified for special circumstances or for special purposes by altering the position and number of conductors along with altering the size, water permeability and number of hollow balls 130.

By constructing the anode electrode and cathode electrode as shown in FIGS. 7, 8 and 9, it is possible to eliminate a diffuser plate (20, 22 or 66) at both the upstream and downstream ends of the tank. That is, the anode electrode and cathode electrode perform the water flow diffusing functions as well as the associated electrical field generating functions.

It is understood that tank 100 may incorporate moveable walls, as described with respect to tank 10. Furthermore, the pump for recirculating the water in tank 100, like that shown for tank 10 may be employed. Alternatively, tank 10 may be used in circumstances of continuously receiving fresh water and discharging water from the downstream end as described with respect to tank 100. Anode electrode 112 and cathode electrode 114 may be used in tank 10 in place of the anode and cathode and the diffuser plates shown in FIGS. 1-4.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for electroanesthetizing aquatic animals, said apparatus comprising in combination:
    a) a compartment for containing water and the aquatic animals to be electroanesthetized;
    b) a source of electric power for generating an electric signal to establish an electric field in said compartment to electroanesthetize the aquatic animals;
    c) a first electrode disposed at one part of said compartment;
    d) a second electrode disposed at another part of said compartment;
    e) means for interconnecting said first and second electrodes with said power source to establish the electric field within said compartment and commensurate flow of electric current between said first and second electrodes; and f) means for shielding at least one of said first and second electrodes to prevent contact between the aquatic animals and the shielded at least one electrode, said shielding means including means of accommodating flow of water about the substantially complete immersed areas of said shielded at least one electrode.

2. The apparatus as set forth in claim 1 wherein said shielding means includes further shielding means for shielding the other of said first and second electrodes.

3. The apparatus as set forth in claim 1 wherein said first electrode is an anode electrode and wherein said second electrode is a cathode electrode.

4. The apparatus as set forth in claim 1 wherein each of said first and second electrodes comprises an electrically conducting plate.

5. The apparatus as set forth in claim 1 wherein each of said first and second electrodes comprises electrically interconnected rods.

6. The apparatus as set forth in claim 5 wherein said shielding means comprises a plurality of apertured hollow spheres penetrably engaged by said rods.

7. The apparatus as set forth in claim 1 wherein said shielding means comprises a barrier.

8. Apparatus for electroanesthetizing aquatic animals, said apparatus comprising in combination:
   a) a compartment for containing water and the aquatic animals to be electroanesthetized;
   b) a source of electric power for generating an electric signal to establish an electric field in said compartment to electroanesthetize the aquatic animals, said electric signal comprising a pulse train having a packet of high frequency pulses repeated at a low frequency rate for inducing petit mal in the aquatic animals and for preventing myoclonic jerks in the aquatic animals;
   c) a first electrode disposed at one part of said compartment;
   d) a second electrode disposed at another part of said compartment; and
   e) means for interconnecting said first and second electrodes with said power source to establish the electric field within said compartment and commensurate flow of electric current between said first and second electrodes.

9. Apparatus for inducing petit mal in aquatic animals without causing injuries in the aquatic animals due to myoclonic jerks, said apparatus comprising in combination:
   a) a compartment for containing water and the aquatic animals;
   b) an anode electrode disposed at one part of said compartment;
   c) a cathode electrode disposed at another part of said compartment;
   d) a signal source for generating a pulse train having a packet of high frequency pulses repeated at a low frequency rate; and
   e) means for interconnecting said signal source with said anode and cathode electrodes to produce an electric field within said compartment.

10. The apparatus as set forth in claim 9 wherein said signal source generates an electric field of sufficient power to establish a voltage gradient across each aquatic animal at least equivalent to the rhobase voltage of the respective aquatic animal.

11. The apparatus as set forth in claim 9 including means for shielding the aquatic animals from said anode electrode to prevent contact between the aquatic animals and said anode electrode.

12. The apparatus as set forth in claim 9 wherein said anode electrode comprises a plurality of rods and including a plurality of apertured hollow spheres penetrably engaged by said rods for shielding said plurality of rods against contact by the aquatic animals.

13. The apparatus as set forth in claim 9 wherein said anode electrode comprises at least one rod.

14. The apparatus as set forth in claim 13 including means for shielding each said at least one rod against contact of each said at least one rod by the aquatic animals while accommodating flow of water through said shielding means.

15. The apparatus as set forth in claim 14 wherein said shielding means comprises a plurality of apertured hollow spheres mounted upon each said at least one rod.

16. The apparatus as set forth in claim 9 including means for shielding said anode electrode against contact by the aquatic animals while accomodating flow of water through said shielding means.

17. The apparatus as set forth in claim 16 wherein said shielding means is mounted upon said anode electrode.

18. The apparatus as set forth in claim 17 wherein said shielding means comprises at least one apertured hollow sphere.

19. The apparatus as set forth in claim 16 wherein said shielding means is of dielectric material.

20. The apparatus as set forth in claim 19 wherein said shielding means is mounted upon said anode electrode.

* * * * *